(12) United States Patent
Boyle et al.

(10) Patent No.: US 8,693,403 B1
(45) Date of Patent: Apr. 8, 2014

(54) METHOD AND SYSTEM FOR DETECTION AND CORRECTION OF A WIFI LOGIN FAILURE

(71) Applicant: Joingo, LLC, San Jose, CA (US)

(72) Inventors: Stephen S. Boyle, Lincoln, CA (US); Thang Dao, San Jose, CA (US)

(73) Assignee: Joingo, LLC, San Jose, CA (US)

( * ) Notice: Subject to any disclaimer, the term of this patent is extended or adjusted under 35 U.S.C. 154(b) by 0 days.

(21) Appl. No.: 13/783,346

(22) Filed: Mar. 3, 2013

Related U.S. Application Data

(60) Provisional application No. 61/671,409, filed on Jul. 13, 2012.

(51) Int. Cl.
*H04W 4/00* (2009.01)

(52) U.S. Cl.
USPC .......................................... 370/328; 370/329

(58) Field of Classification Search
USPC ................................. 370/328, 329
See application file for complete search history.

(56) References Cited

U.S. PATENT DOCUMENTS

| 7,568,107 | B1 | 7/2009 | Rathi et al. |
| 7,929,964 | B2 | 4/2011 | Arumi et al. |
| 2004/0235455 | A1* | 11/2004 | Jiang .............................. 455/411 |
| 2006/0212507 | A1* | 9/2006 | Clark et al. ................... 709/200 |
| 2009/0100024 | A1* | 4/2009 | Manesh et al. ..................... 707/3 |
| 2010/0329461 | A1 | 12/2010 | Duplesses et al. |
| 2011/0252071 | A1* | 10/2011 | Cidon .......................... 707/802 |
| 2012/0036018 | A1* | 2/2012 | Feliciano et al. .......... 705/14.66 |
| 2012/0264444 | A1* | 10/2012 | Yu ................................. 455/450 |
| 2013/0155876 | A1* | 6/2013 | Potra et al. ................... 370/248 |
| 2013/0262198 | A1* | 10/2013 | Chung ........................ 705/14.1 |
| 2014/0006205 | A1* | 1/2014 | Berry et al. ................. 705/26.7 |

* cited by examiner

*Primary Examiner* — Farah Faroul
(74) *Attorney, Agent, or Firm* — Clause Eight IPS; Michael Catania

(57) ABSTRACT

A method and system for detection and correction of a WiFi login failure for a mobile application is disclosed herein. The present invention provides a set of diagnostic steps that are undertaken automatically on a mobile communication device to identify this condition within an application and generate a browser window inside the application so that the condition can be fixed and the application can continue without having to time-out and exit an application.

3 Claims, 7 Drawing Sheets

METHOD AND SYSTEM FOR DETECTION AND CORRECTION OF A WIFI LOGIN FAILURE

CROSS REFERENCES TO RELATED APPLICATIONS

The Present Application claims priority to U.S. Provisional Patent Application No. 61/671,409, filed on Jul. 13, 2012, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to WiFi connections for mobile communication devices. More specifically, the present invention relates to a method and system for detection and correction of a WiFI login failure for a mobile application.

2. Description of the Related Art

Mobile communication device end-users constantly face a particular problem when using a local WiFi connection with a mobile communication device. Many times, whether on an airplane, in a hotel room, or in another facility with a local WiFi connection, a user attempts to run an application on a mobile communication device and the application times-out. Upon inspection, the end-user determines that the signal strength is good and there is a connection to a local WiFi connection. Some end-users will try to start a browser of the mobile communication device to determine if there is something that needs to be agreed to or a login. Other end-users will be bewildered, and frustrated that they cannot access an application on the mobile communication device.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Direct Inward Dialing ("DID") involves a carrier providing one or more trunk lines to a customer for connection to the customer's private branch exchange ("PBX") and a range of telephone lines are allocated to this line.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server.

Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Interactive voice response ("IVR") is a telephone technology in which a user uses a phone to interact with a database to acquire information.

Long Term Evolution ("LTE") is a next generation communication network.

Multimedia messaging service ("MMS") communication is a communication transmitted to and from a mobile phone that includes a multimedia content such as a digital photograph (JPEG), videos, and the like.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Short Message Service ("SMS") is text messaging communication using a mobile phone or other device to send messages up to 160 characters in length.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

A SMS aggregator is an entity that provides connectivity with a mobile phone carrier by offering a SMS gateway to send and receive messages and other digital content.

A SMS Gateway is used to send text messages with or without a mobile phone, and is used by aggregators to forward text messages to mobile phones.

Telephone Consumer Protection Act ("TCPA") of 1991 restricts the use of SMS text messages received by mobile phones, and SMS messages sent without a consumer's consent can violate the TCPA.

Transfer Control Protocol/Internet Protocol ("TCP/IP") is a protocol for moving files over the Internet.

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

The prior art has failed to provide a means for automatically determining and correcting a WiFi login failure.

BRIEF SUMMARY OF THE INVENTION

The present invention is provides a solution to the problem. The present invention provides for automatic detection and correction of a WiFI login failure for a mobile application. The present invention provides a set of diagnostic steps that are undertaken automatically on a mobile communication device to identify this condition within an application and generate a browser window inside the application so that the condition can be fixed and the application can continue without having to time-out and exit.

One aspect of the present invention is a method for detection and correction of a WiFi login failure for a mobile application. The method includes launching a mobile application on a mobile communication device. The method also includes accessing a network through a WiFi connection of a facility for an action on the mobile application. The method also includes determining that access to the WiFi connection of the facility on the mobile application has failed. The method also includes displaying a login for the WiFi connection of the facility on the mobile application to login to gain access to the WiFi connection.

The mobile communication device is preferably a mobile phone or a tablet computer.

Another aspect of the present invention is a mobile communication device comprising a mobile application resident on the mobile communication device. The mobile application is configured to access a network through a WiFi connection of a facility for an action, determine that access to the WiFi connection of the facility on the mobile application has failed, display a login for the WiFi connection of the facility on the mobile application to login to gain access to the WiFi connection. The mobile communication device is preferably a mobile phone or tablet computer.

Yet another aspect of the present invention is a system for detection and correction of a WiFi login failure for a mobile application. The system includes a facility having WiFi access to the Internet available through a WiFi connection with a login and at least one mobile communication device. The mobile communication comprises a mobile application configured to access a network through a WiFi connection of a facility for an action, determine that access to the WiFi connection of the facility on the mobile application has failed, display a login for the WiFi connection of the facility on the mobile application to login to gain access to the WiFi connection.

Yet another aspect of the present invention is a method for detection and automatic correction of a WiFi login failure for a mobile application. The method includes launching a mobile application on a mobile communication device. The method also includes accessing a network through a WiFi connection of a facility for an action on the mobile application. The method also includes determining that access to the WiFi connection of the facility on the mobile application has failed. The method also includes automatically transmitting a login for the WiFi connection of the facility for the mobile communication device to login to gain access to the WiFi connection.

Yet another aspect of the present invention is a method for detection and correction of a WiFi login failure for a mobile application. The method includes launching a mobile application on a mobile communication device. The method also includes accessing a network through a WiFi connection of a facility for an action on the mobile application. The method also includes determining that a link to a web address over the WiFi connection is inaccessible. The method also includes determining that the mobile communication device is connected to the WiFi connection of the facility. The method also includes determining that a login must be completed. The method also includes displaying a login for the WiFi connection of the facility on the mobile application to login to gain access to the WiFi connection.

Yet another aspect of the present invention is a system for detection and correction of a WiFi login failure for a mobile application. The system includes a facility having WiFi access to the Internet available through a WiFi connection with a login and a mobile communication device. The mobile communication device comprises a mobile application configured to access a network through a WiFi connection of a facility for an action, determine that a link to a web address over the WiFi connection is inaccessible, determine that the mobile communication device is connected to the WiFi connection of the facility, determine that a login must be completed, and display a login for the WiFi connection of the facility on the mobile application to login to gain access to the WiFi connection.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
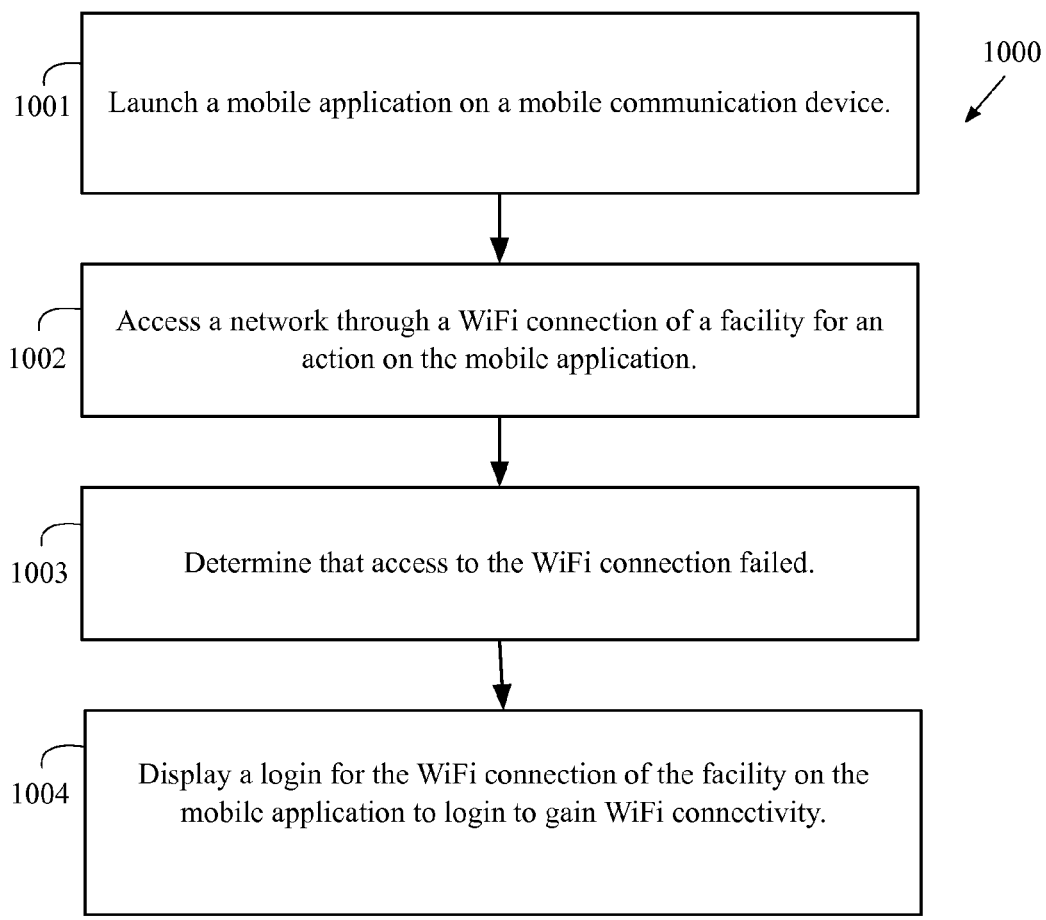
FIG. 1 is a flow chart for a method for WiFi login correction and detection.

A method 1000 for detection and correction of a WiFi login failure for a mobile application is shown in FIG. 1. At block 1001, a mobile application is launched on a mobile communication device. At block 1002, a network is accessed through a WiFi connection of a facility for an action on the mobile application. At block 1003, the mobile application determines that access to the WiFi connection of the facility on the mobile application has failed. At block 1004, a login for the WiFi connection of the facility is displayed on the mobile application to login to gain access to the WiFi connection.

Figure 2:
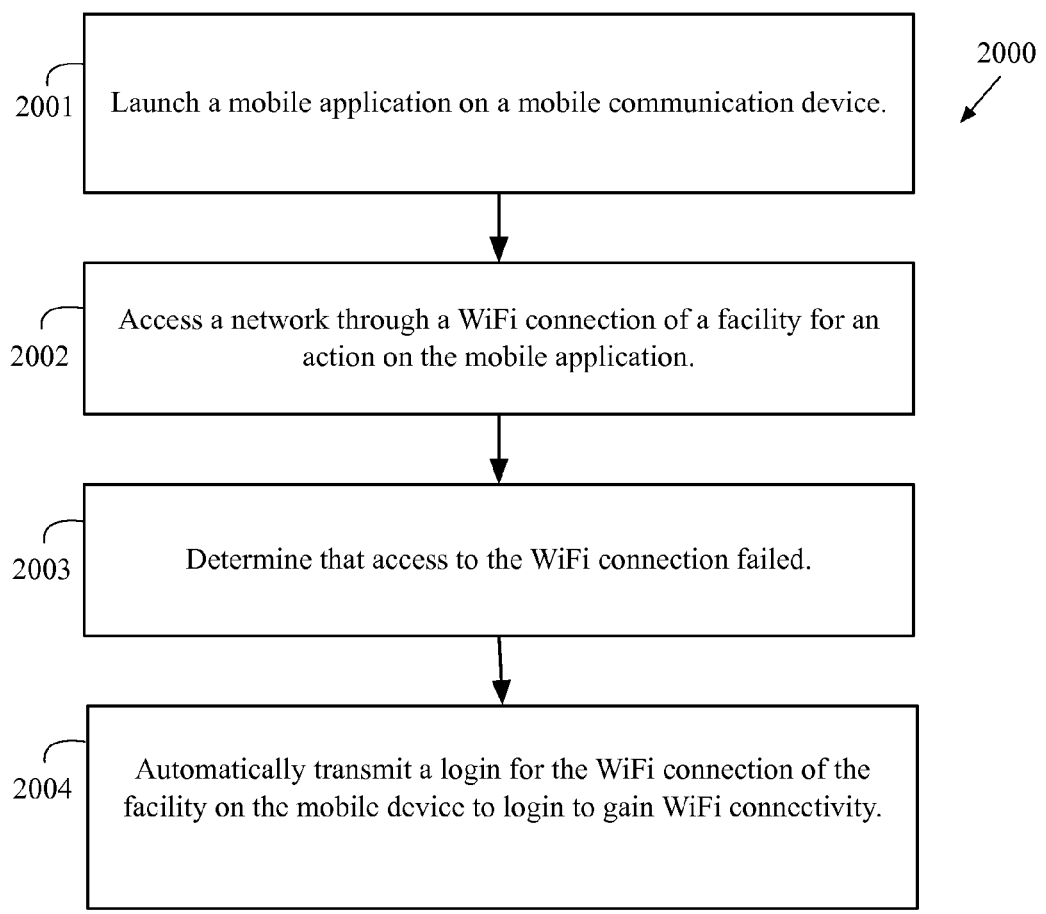
FIG. 2 is a flow chart for a method for WiFi login correction and detection.
Figure 3:
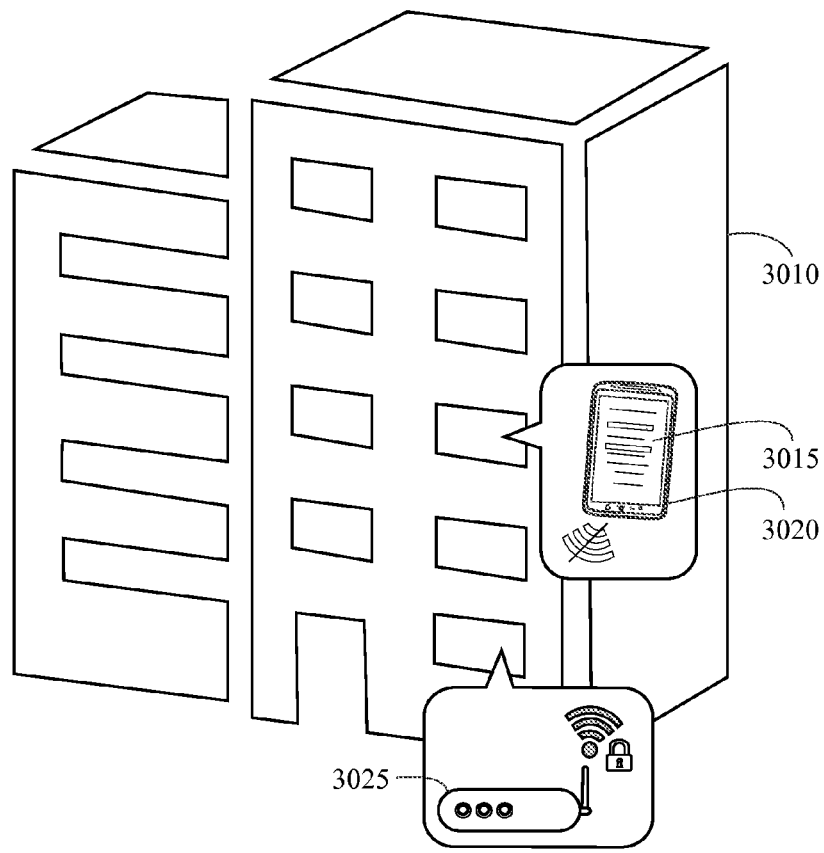
FIG. 3 is an illustration of a facility having a WiFi connection.
Figure 3A:
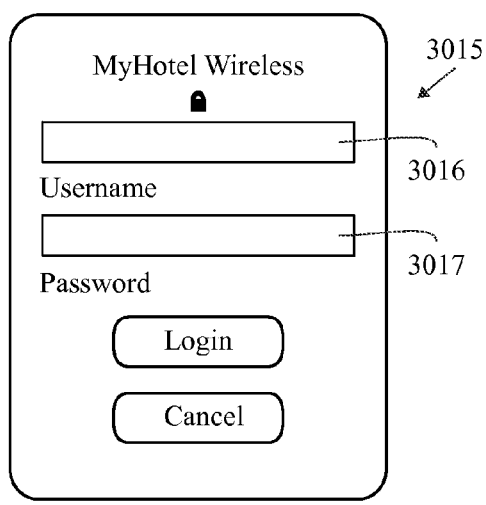
FIG. 3A is an illustration of a WiFi login for a mobile communication device.
Figure 4:
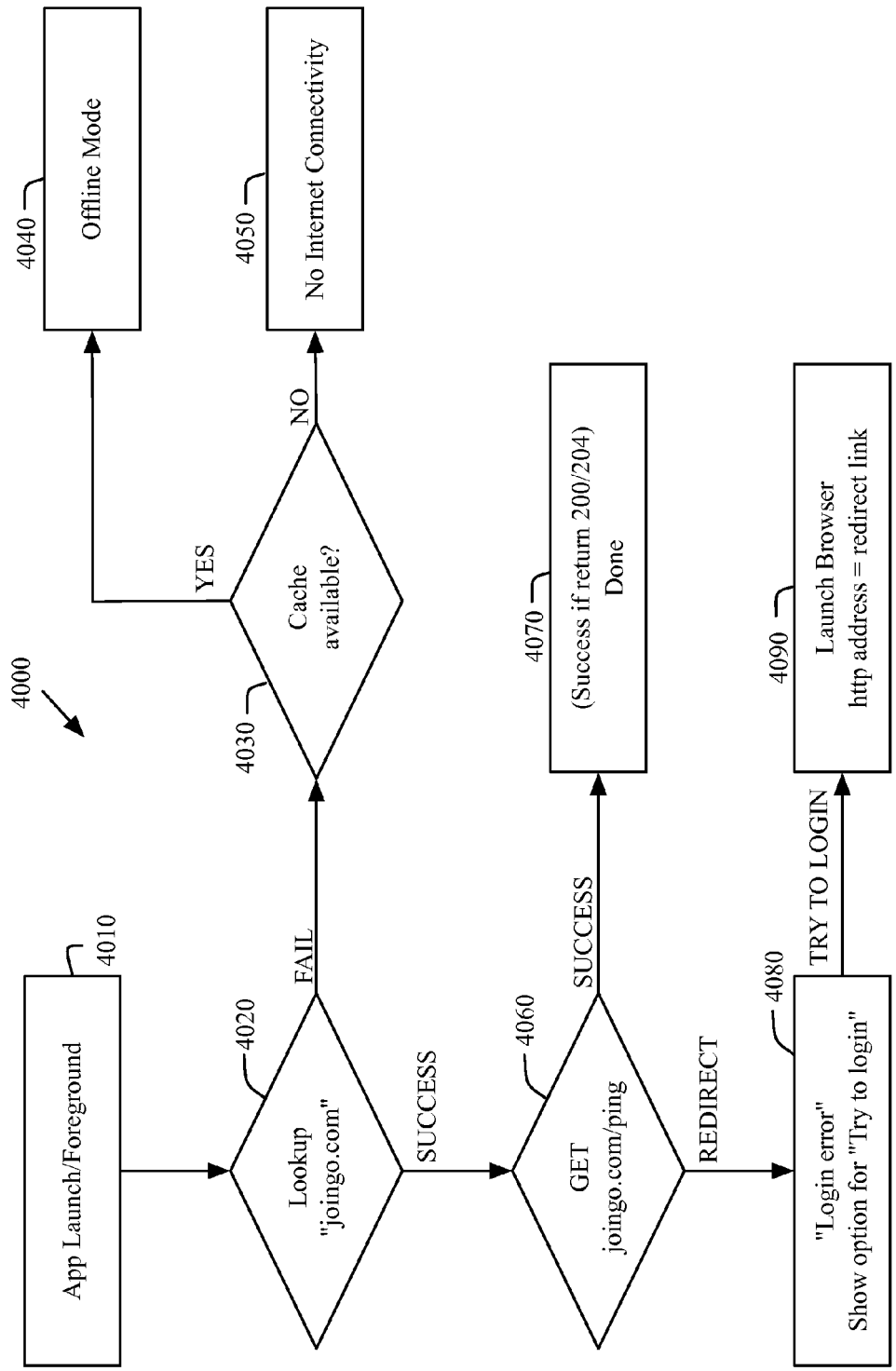
FIG. 4 is a block diagram of a flow chart for WiFi login failure detection and correction.

A method 2000 for detection and automatic correction of a WiFi login failure for a mobile application is shown in FIG. 2. At block 2001, a mobile application is launched on a mobile communication device. At block 2002, a network is accessed through a WiFi connection of a facility for an action on the mobile application. At block 2003, the mobile application determines that access to the WiFi connection of the facility on the mobile application has failed. At block 2004, the mobile application automatically transmits a login for the WiFi connection of the facility for the mobile communication device to login to gain access to the WiFi connection.

Figure 5:
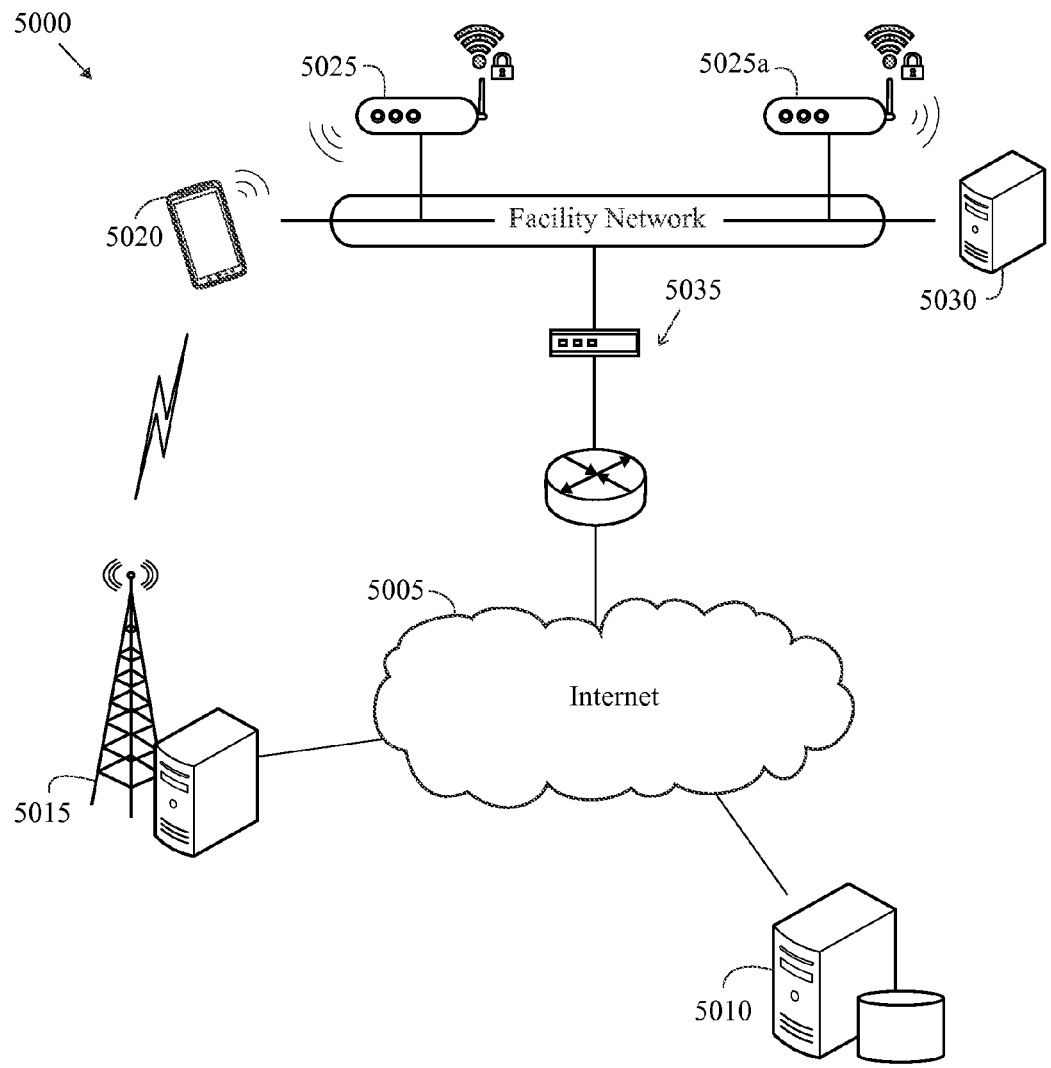
FIG. 5 is a block diagram of a system for WiFi login failure detection and correction.

A system 5000 for detection and correction of a WiFi login failure for a mobile application is shown in FIG. 5. The system 5000 includes a network 5005 such as the Internet, a third party server 5010, a mobile communication service provider 5015, a mobile communication device 5020, wireless access points 5025 and 5025a, a facility server 5030 and a firewall 5035 of a facility network. A mobile application is launched on the mobile communication device 5020. The mobile communication device 5020 accesses the facility network through a wireless access point 5025 for a WiFi connection of the facility network for an action on the mobile application. The mobile application determines that a link to a web address over the WiFi connection is inaccessible. The mobile application determines that the mobile communication device 020 is connected to the WiFi connection of the facility network. The mobile application also determines that a login must be completed. The mobile application displays a login for the WiFi connection of the facility on the mobile application to login to gain access to the WiFi connection of the facility network.

A system 5000 for detection and correction of a WiFi login failure for a mobile application is shown in FIG. 5. The system 5000 includes a network 5005 such as the Internet, a third party server 5010, a mobile communication service provider 5015, a mobile communication device 5020, wireless access points 5025 and 5025a, a facility server 5030 and a firewall 5035 of a facility network. A mobile application is launched on the mobile communication device 5020. The mobile communication device 5020 accesses the facility network through a WAP 5025 for a WiFi connection of the facility network for an action on the mobile application. The mobile application determines that a link to a web address over the WiFi connection is inaccessible. The mobile application determines that the mobile communication device 020 is connected to the WiFi connection of the facility network. The mobile application also determines that a login must be completed. The mobile application displays a login for the WiFi connection of the facility on the mobile application to login to gain access to the WiFi connection of the facility network.

Figure 6:
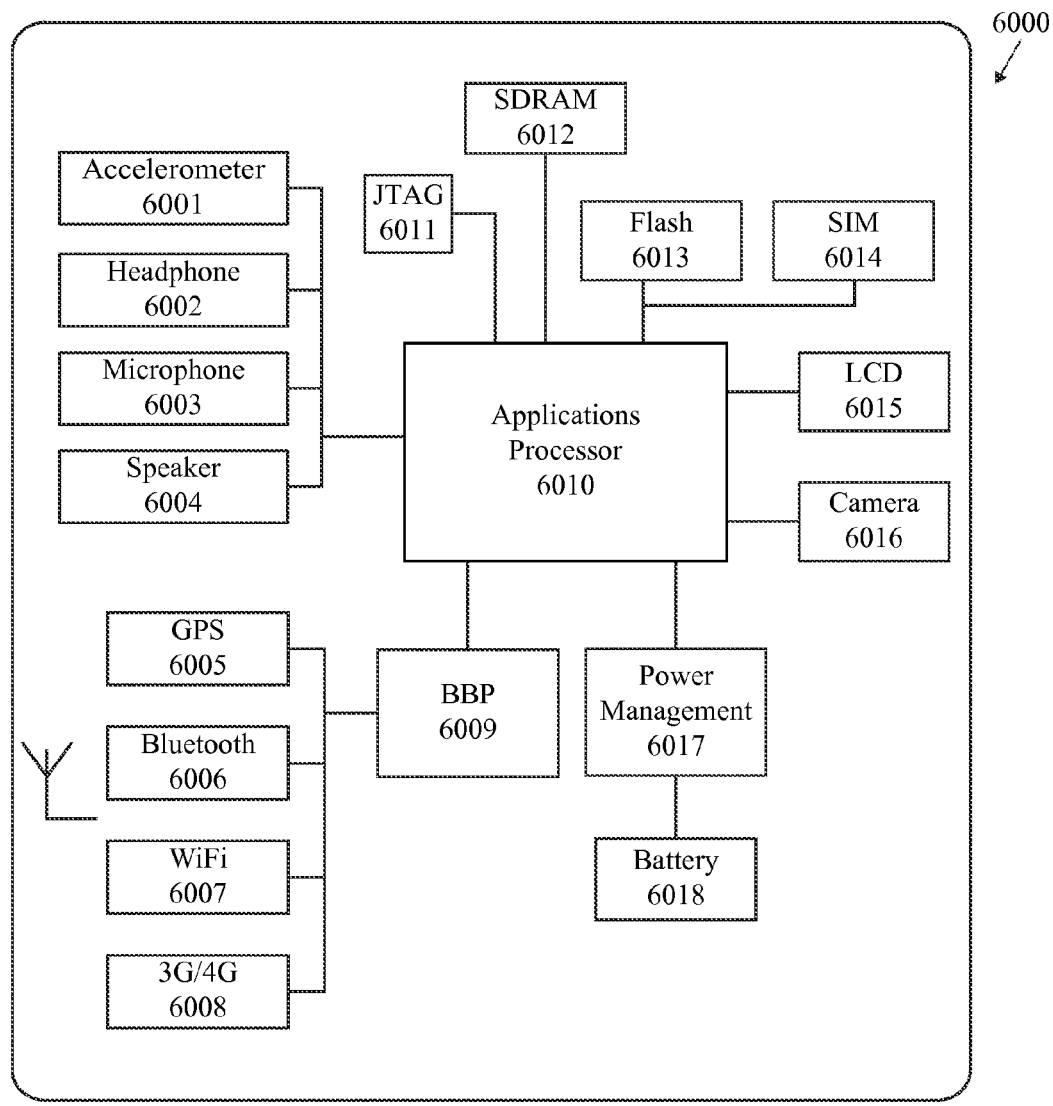
FIG. 6 is a block diagram of components of a mobile communication device.

As shown in FIG. 6, a typical mobile communication device 6000 includes an accelerometer 6001, a head phone 6002, a microphone 6003, a speak 6004, a GPS chipset 6005, a Bluetooth component 6006, a WiFi component 6007, a 3G/4G component 6008, a BaseBand Processor (for radio control) 6009, an applications processor 6010, a JTAG (debugger) 6011, a SDRAM memory 6012, a Flash memory 6013, SIM card 6014, LCD display 6015, a camera 6016, a power management circuit 6017 and a battery or power source 6018

The mobile communication devices utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Most of the interface descriptions preferably disclose use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol Secure ("HTTPS"), or other similar protocols. The transmission protocol ranges from SIP to MGCP to FTP and beyond. The protocol at a server is preferably HTTPS.

A mobile communication service provider (aka phone carrier) of the customer such as VERIZON, AT&T, SPRINT, T-MOBILE, and the like mobile communication service providers, provide the communication network for communication to the mobile communication device of the end user.

Figure 7:
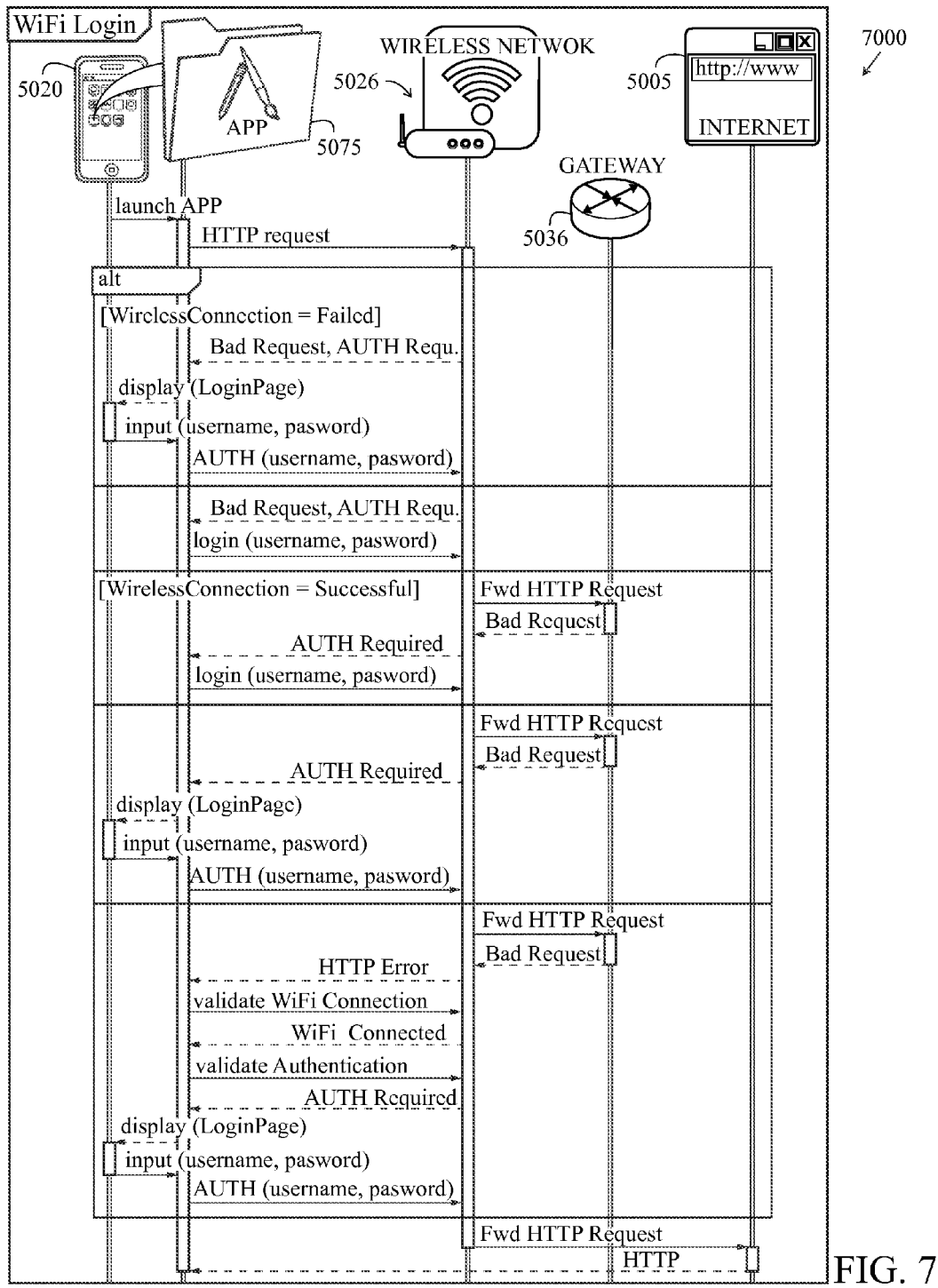
FIG. 7 is a sequence diagram for WiFi login failure detection and correction.

FIG. 7 illustrates a sequence diagram 7000 for detection and correction of a WiFi login failure for a mobile application. A mobile application 5072 is launched on a mobile communication device 5020. An HTTP request is sent to a wireless network 5026 of a facility. A wireless connection fails, and a bad request message is sent from the wireless network 5026 to the mobile communication device 5020. The mobile application displays a login page, to authenticate a username and password, and again a wireless connection fails, and a bad request message is sent from the wireless network 5026 to the mobile communication device 5020. The login is successful and the HTTP request is sent to a gateway (firewall or router) 5036. A wireless connection fails, and a bad request message is sent from the gateway 5036 to the mobile communication device 5020. An authentication message is sent to the device 5020, and the login is again attempted. An HTTP error is sent to the mobile device 5020 from the wireless network 5026, and the WiFi connection is authenticated. A login page is displayed and the user enters his username and password. The login is authenticated and the HTTP request is sent to the Internet 5005.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for detection and correction of a WiFi login failure for a mobile application, the method comprising:
    launching a mobile application on a mobile communication device, the mobile application configured for detection and correction of a WiFi login failure, the mobile application resident on the mobile communication device;
    accessing a network through a WiFi connection of a facility for an action on the mobile application, wherein the mobile communication device previously had accessed the network through a WiFi connection of the facility and a WiFi login procedure had been completed by an end user;
    transmitting a HTTP request from the mobile application over the WiFi connection of the facility;
    determining on the mobile application that the HTTP request to a web address over the WiFi connection is inaccessible;
    determining on the mobile application that the mobile communication device is connected to the WiFi connection of the facility;
    determining on the mobile application that a subsequent WiFi login must be completed by the end user to access the network;
    generating a browser window within the mobile application to display a WiFI login for the WiFi connection of the facility on the mobile application to login to gain access to the network through the WiFi connection.

2. The method according to claim 1 further comprising completing the login for the WiFi connection.

3. The method according to claim 2 wherein completing the login is automatically performed by the mobile application.

* * * * *